July 17, 1928.

H. W. HYDE 1,677,676

SPRING SUSPENSION FOR VEHICLES

Filed Aug. 17, 1923

Inventor:
Henry Webb Hyde.
By Macleod, Calver, Copeland & Dike,
Attorneys.

Patented July 17, 1928.

1,677,676

UNITED STATES PATENT OFFICE.

HENRY WEBB HYDE, OF NORTH COHASSET, MASSACHUSETTS, ASSIGNOR TO HYDE ENGINEERING COMPANY, OF BOSTON, MASSACHUSETTS, A CORPORATION OF MASSACHUSETTS.

SPRING SUSPENSION FOR VEHICLES.

Application filed August 17, 1923. Serial No. 657,990.

This invention relates to vehicle spring suspensions of the general type shown and described in my prior application for Letters Patent, filed September 29, 1921, Serial No. 504,160, patented Jan. 27, 1925, No. 1,524,437, of which the present case is a division in part and with respect to such subject matter as it has in common therewith.

As explained in said prior application, the invention disclosed therein consists primarily in providing the vehicle with longitudinal springs or spring reaches connected at their ends, either directly or indirectly, with the axles, and in supporting the body on the spring reaches intermediate the ends of the latter in such a manner as to permit said body to rock freely, with respect to and independently of the reaches, upon a horizontal, transverse axis, so that tilting or rocking of the reaches, caused by a vertical movement of either the front or rear wheels and the axle carried thereby, will not be transmitted to the body and will not tend to tip or pitch the same, said body being permitted, by rocking about its axis with respect to the reaches, to maintain its substantially horizontal position, its only movement being a slight vertical one in a substantially rectilinear direction.

The present case relates to a form of spring suspension, of the type above referred to, which is particularly adapted for vehicles in which the load varies. The present invention has, therefore, for its object to provide a construction wherein certain points of interengagement between the cooperating parts, and particularly the axis about which the body rocks with respect to the reaches, will be automatically varied as the load of the vehicle varies in order to preserve the proper balance between the parts.

The foregoing and other objects of the invention, together with means whereby the same may be carried into effect, will best be understood from the following description of certain forms or embodiments thereof illustrated in the accompanying drawings. It is to be understood, however, that the particular constructions described and shown have been chosen for illustrative purposes merely, and that the invention, as defined by the claims hereunto appended, may be otherwise practiced without departure from its spirit and scope.

The principle of operation of a spring suspension of the general type of that to which the present case relates is fully explained in my prior patent above referred to. For the purposes of the present description this principle may be briefly outlined as follows:

In the ordinary vehicle, whether provided with elliptical, semi-elliptical, or cantilever springs, the springs are, in effect rigidly secured to the body or frame, and any shock or blow on a wheel, due to unevenness in the road, which causes the wheel to rise or fall suddenly, is communicated directly to the body.

In the type of spring suspension to which the present invention relates, on the contrary, if the front wheel, for example, be raised, owing to an unevenness in the road, the tendency is for the spring reach to turn about the pivot afforded by the rocker on which the body is supported, but not to rock the body. It thus tends to swing the rear end of the reach and rear axle downward about the pivot, so that the chief effect of the blow is absorbed by the rear spring and pneumatic tire on the rear wheel. Likewise, when the rear wheel goes over an obstruction or drops into a hole, the front spring member and front wheel receive the major part of the reaction and the body is affected relatively little. In any event, any lifting force, or the resultant of such lifting forces as may be transmitted to the body as a result of the rocking of the reaches, is applied to the body substantially through the center of gravity thereof, so that there is no gyratory force acting upon the body eccentric to its center of gravity. The effect on the body is merely to lift the pivot, and consequently the body, vertically to a slight extent, and not to rock said body from front to back, so that the body is not given any pitching motion. The action described is permitted by the pivotal or rocking connection between the body and the spring reaches. If there were a rigid connection at this point, the blow would give the body an entirely different movement and would not be absorbed by the opposite end of the spring reach.

Figure 1:
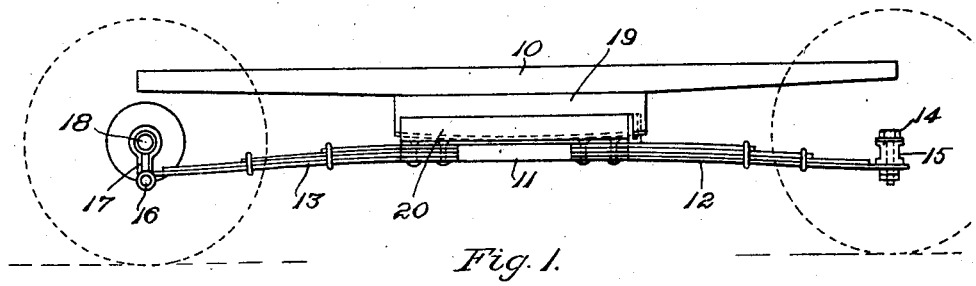
Fig. 1 is a side elevation.
Figure 2:
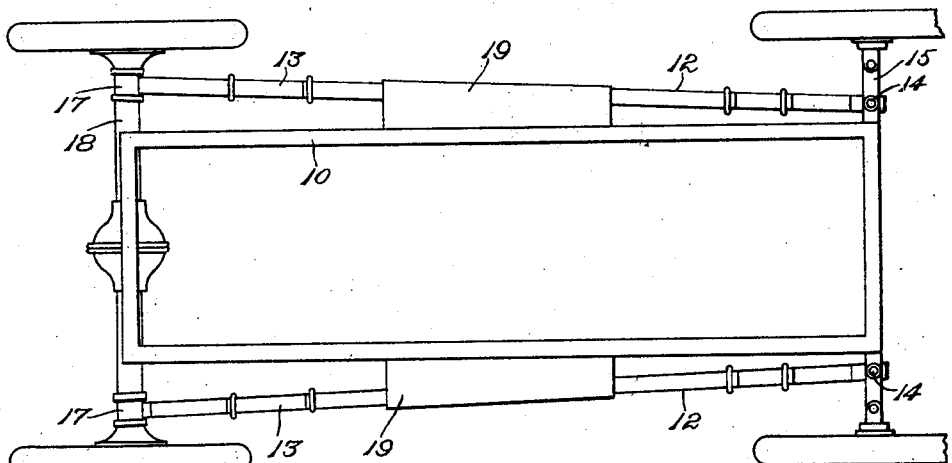
Fig. 2 is a plan view of a simple form of spring suspension embodying the invention.

Referring now to the drawings, in Figures 1 and 2 is shown a spring suspension comprising a pair of spring reaches to which the body frame 10 is connected by means of a movable fulcrum, so that the point of application of the load on the spring reaches can vary lengthwise of the vehicle as the distribution of the load varies. Said spring reaches are composed of beams 11 having leaf spring extensions 12 and 13 at their forward and rear ends, respectively. The extensions 12 are secured by bolts 14 to the front axle 15, while the extensions 13 are pivoted at 16 to hangers 17 on the rear axle 18. The body 10 is supported on the beams 11 by means of rockers 19 which rest in and have a rolling engagement with U-shaped troughs 20 carried by said beams. The rockers 19 afford a movable fulcrum or axis tending automatically to move toward that end of the vehicle which is most heavily loaded, and consequently tending to maintain itself beneath the center of gravity of the body, so that said body is permitted to maintain its balanced position by its inertia; irrespective of the rocking of the reaches under inequalities in the road, as above explained.

Figure 3:
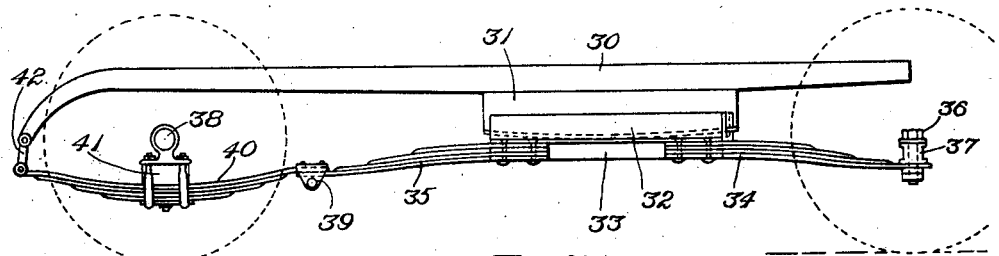
Fig. 3 is a view similar to Fig. 1 illustrating a modification.

In Figure 3 there is shown a modification of the construction above described. As shown in this figure, the body frame 30 is provided with rockers 31 which are received in U-shaped troughs 32, carried by beams 33, which, as in the form of the invention first described, are provided with front and rear spring extensions 34 and 35 to constitute spring reaches of the character above referred to. Also, as in the form of the invention shown in Figures 1 and 2, the forward ends of the forward spring extensions 34 are secured by bolts 36 to the front axle 37, but in this form of the invention the rear spring extensions 35 are not directly supported by the rear axle 38, but are connected by shackles 39 with the forward ends of semi-elliptical springs 40 supported by hangers 41 from said rear axle. The forward ends of said springs 40 constitute extensions of the spring reaches, connecting the latter with the axle, while the rear ends of said springs 40, at the opposite side of the axle 38, are connected by shackles 42 with the rear end of the body frame 30. The operation of the rockers 31 is substantially the same as that of the rockers 19 above described, but in this form of the invention said rockers 31 are placed forward of the center of gravity of the body, so that the axis about which said body rocks with respect to the spring reaches is also forward of the center of gravity of the body, the rear end of said body being acted upon by the rear ends of the springs 40, which constitute balancing springs operating, as more fully explained in my prior patent, above referred to, to balance the forces about the center of gravity of the body when the rear axle is raised. It will also be seen that when the front axle 37 is raised, tending to raise the forward end of the body, the spring reaches, rocking upon the body, will, through the springs 40 acting as levers fulcrumed upon the rear axle 38, tend to lift the rear end of the body also, thereby preventing pitching of the latter in accordance with the principles more fully explained in another application, filed May 28, 1923, Serial No. 641,933.

The accompanying drawings are largely diagrammatic and are designed to illustrate the essential principles of the spring system and its relation to the frame without confusion by non-essential details or features themselves well known in the art. Thus, no means are shown for holding the spring system and frame against relative longitudinal movement or for taking the driving torque, as these parts may be of any usual or well known construction. For example, the form of the invention shown in Figs. 1 and 2 is designed primarily for use with Ford cars, in which case the requirements in question are taken care of by the usual "wishbone" construction. In other cars, these stresses are taken by the usual torque tubes or equivalent elements, as will be familiar to those skilled in the art.

In this specification, the phrase "spring reaches" is employed as a comprehensive term to denote longitudinal members through which the body is supported from the axles and composed wholly or in part of springs. The term, therefore, is to be taken as including a unitary spring as well as a reach composed of a substantially rigid beam to the ends of which are attached springs. It will be understood that when the spring reach is constructed as last described, and as herein shown, the connection between the beam and the springs is a rigid one in the sense that there is no pivotal or other movable connection at this point.

The words "rear", "front", and similar expressions are herein used as convenient illustrative terms, it being obvious that, although the construction shown is preferred for most purposes, the suspension might be oppositely disposed. These and other modifications of the construction shown will, however, be readily apparent to those skilled in the art without further description in detail.

What I claim is:

1. A spring suspension for motor vehicles including a pair of spring reaches each of which comprises a substantially rigid beam having spring extensions rigidly connected thereto and connected respectively with the front and rear axles of the vehicle, and rockers secured to the body and having rolling engagement upon said beams.

2. A spring suspension for motor vehicles including a pair of spring reaches connected at their opposite ends with the axles, and a connection between said reaches and the body upon which the latter is free to rock relatively to the former about a transverse axis which moves longitudinally of the vehicle coincidentally with the relative rocking movement of said parts.

3. A spring suspension for motor vehicles comprising a pair of spring reaches connected at their opposite ends with the axles and a connection between said reaches and the body upon which the latter is free to rock relative to the former, said suspension including members having a rolling engagement with one another to vary their point of engagement longitudinally of the vehicle as the load of the vehicle varies.

In testimony whereof I affix my signature.

HENRY WEBB HYDE.